3,500,892
AUTOMATIC TIRE-CHANGING MACHINE
John E. Lydle, P.O. Box 1094, Akron, Ohio 44305,
Harry H. Whited, Barberton, and Robert R. Dunbar, Massillon, Ohio; said Whited and said Dunbar assignors to said Lydle
Filed Jan. 25, 1968, Ser. No. 700,537
Int. Cl. B60c 25/08
U.S. Cl. 157—1.25       20 Claims

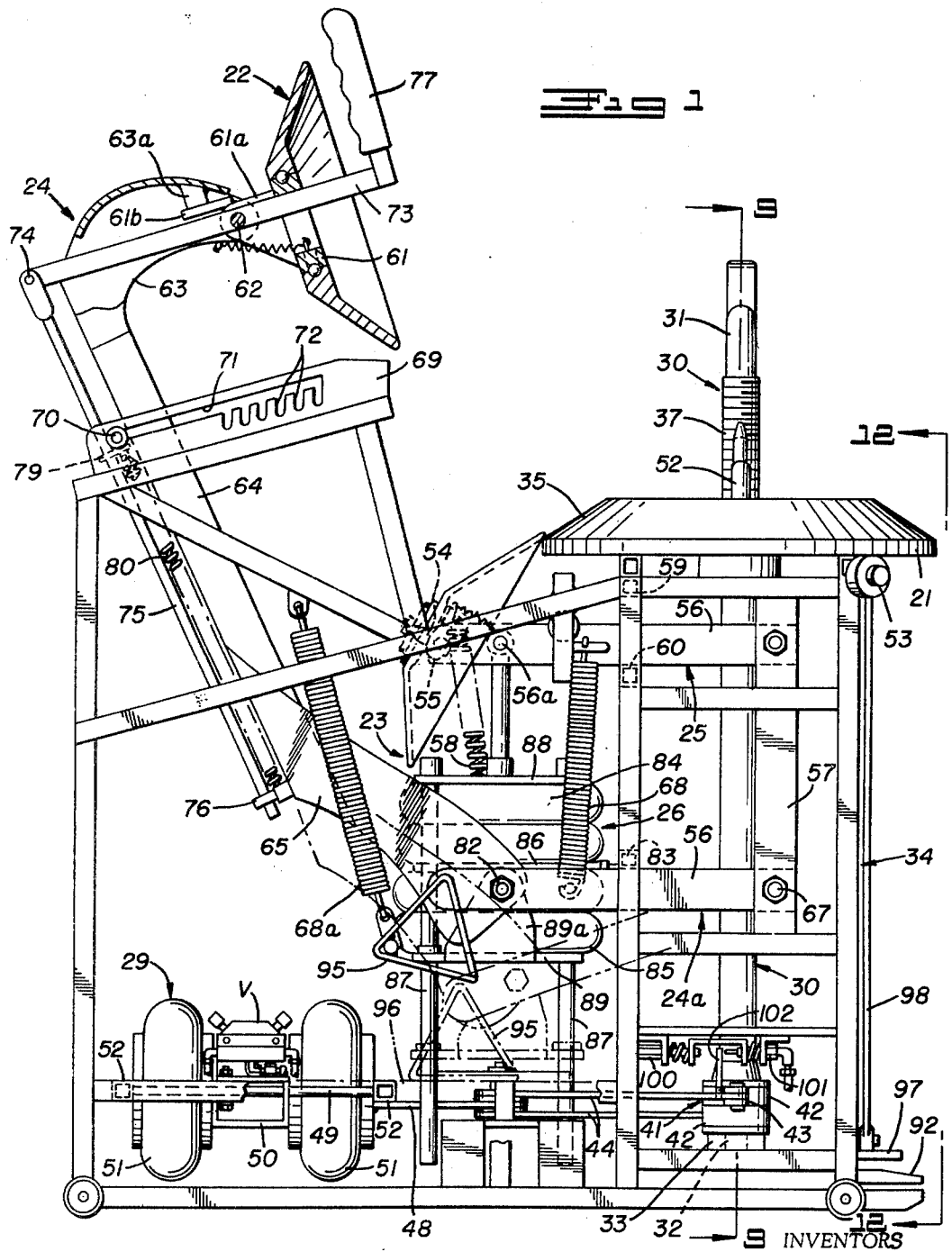

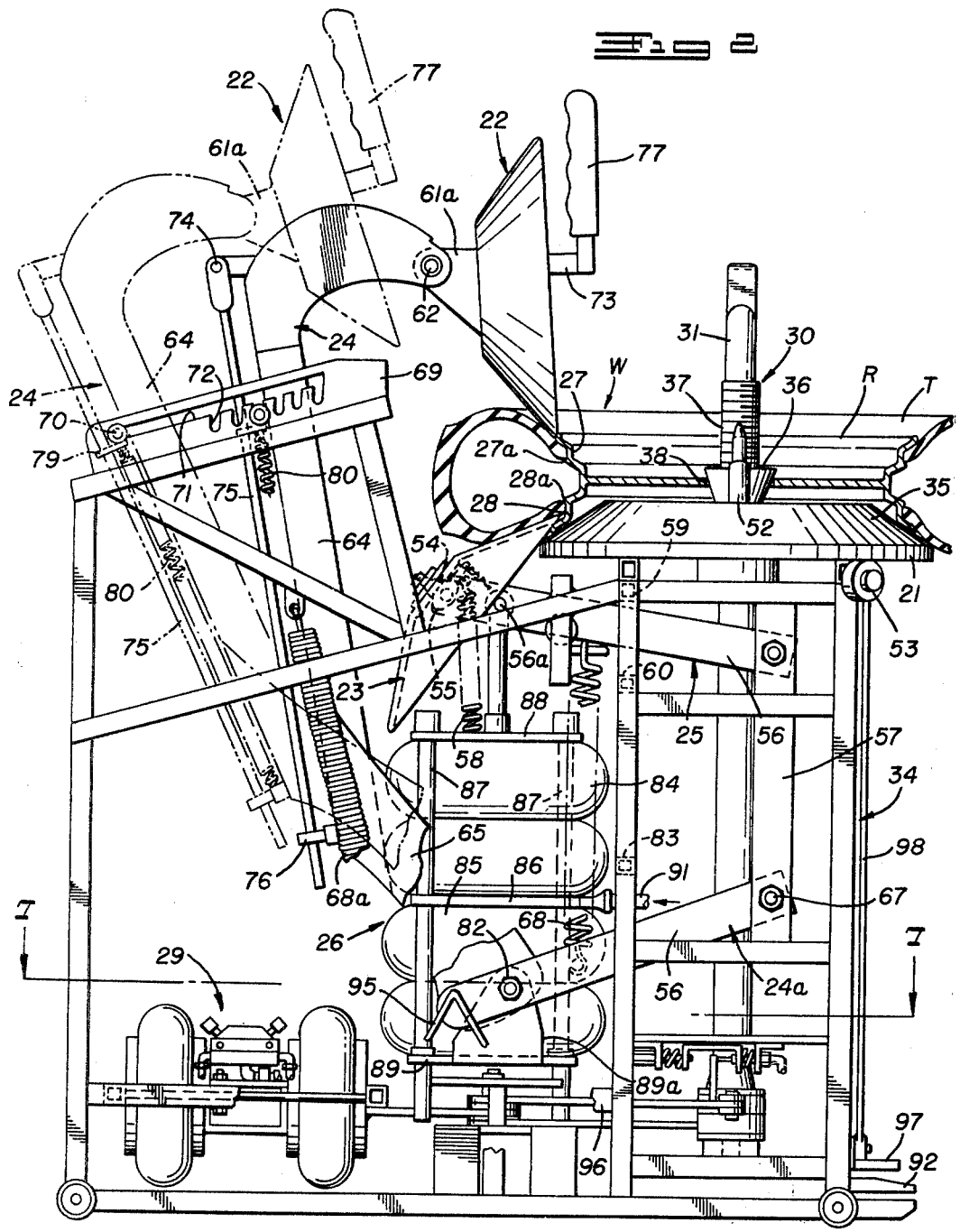

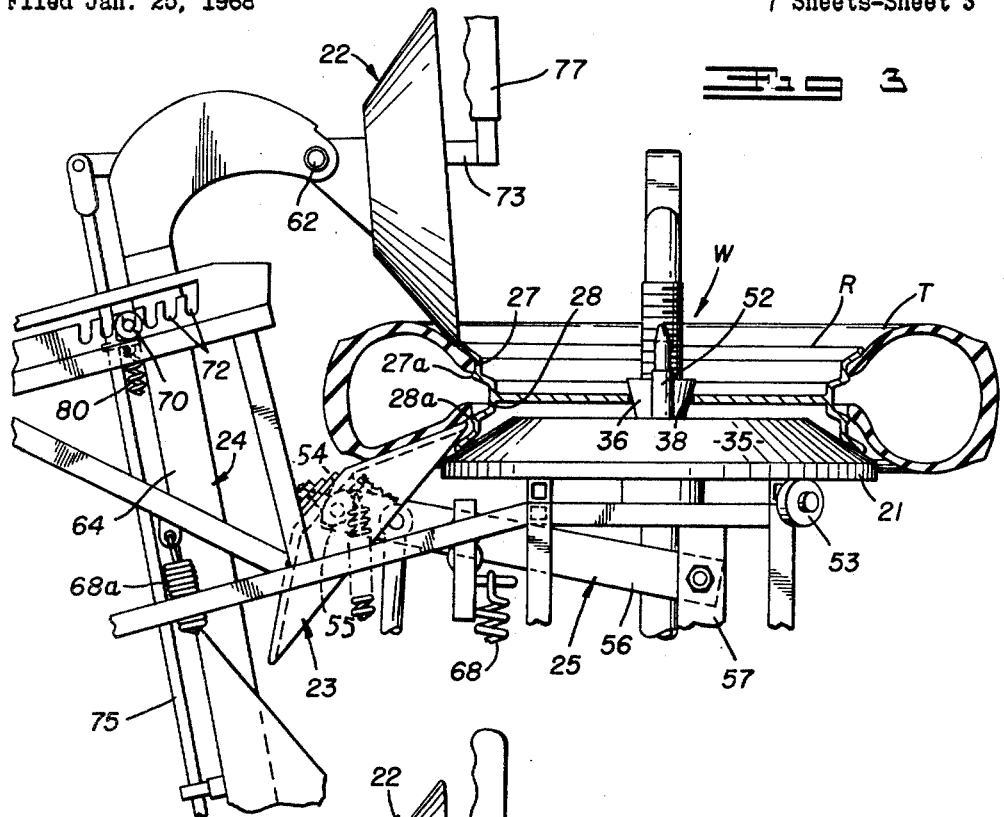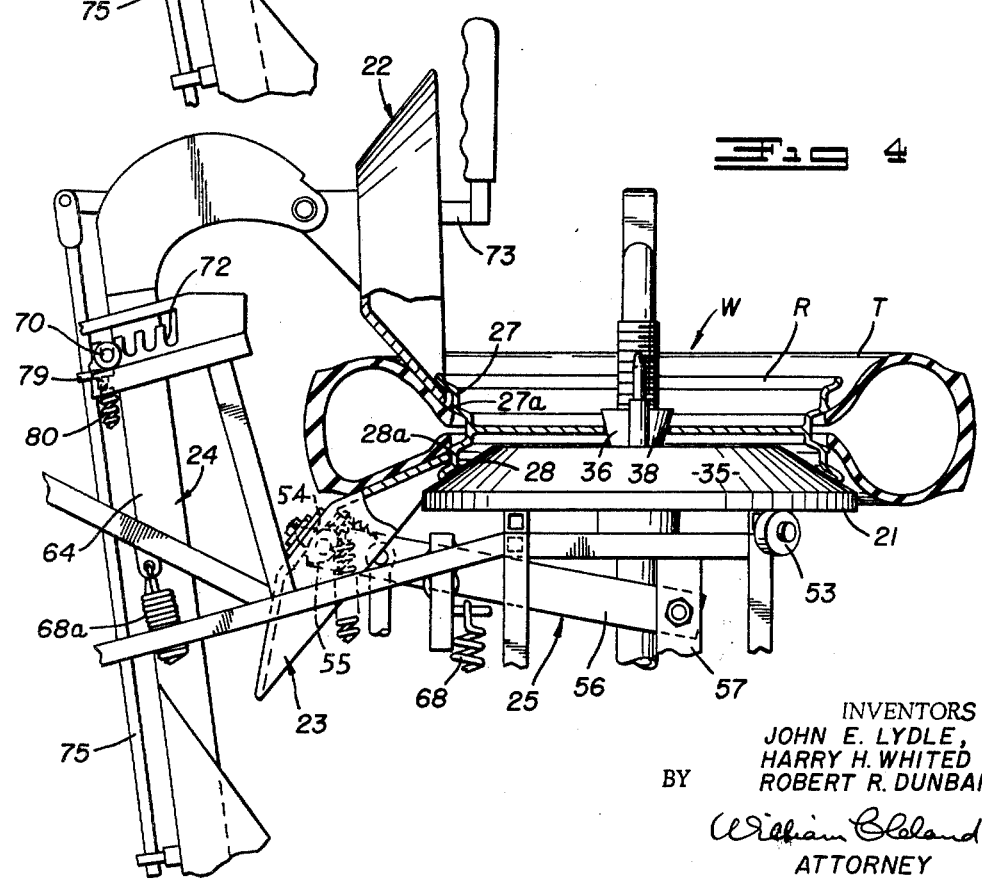

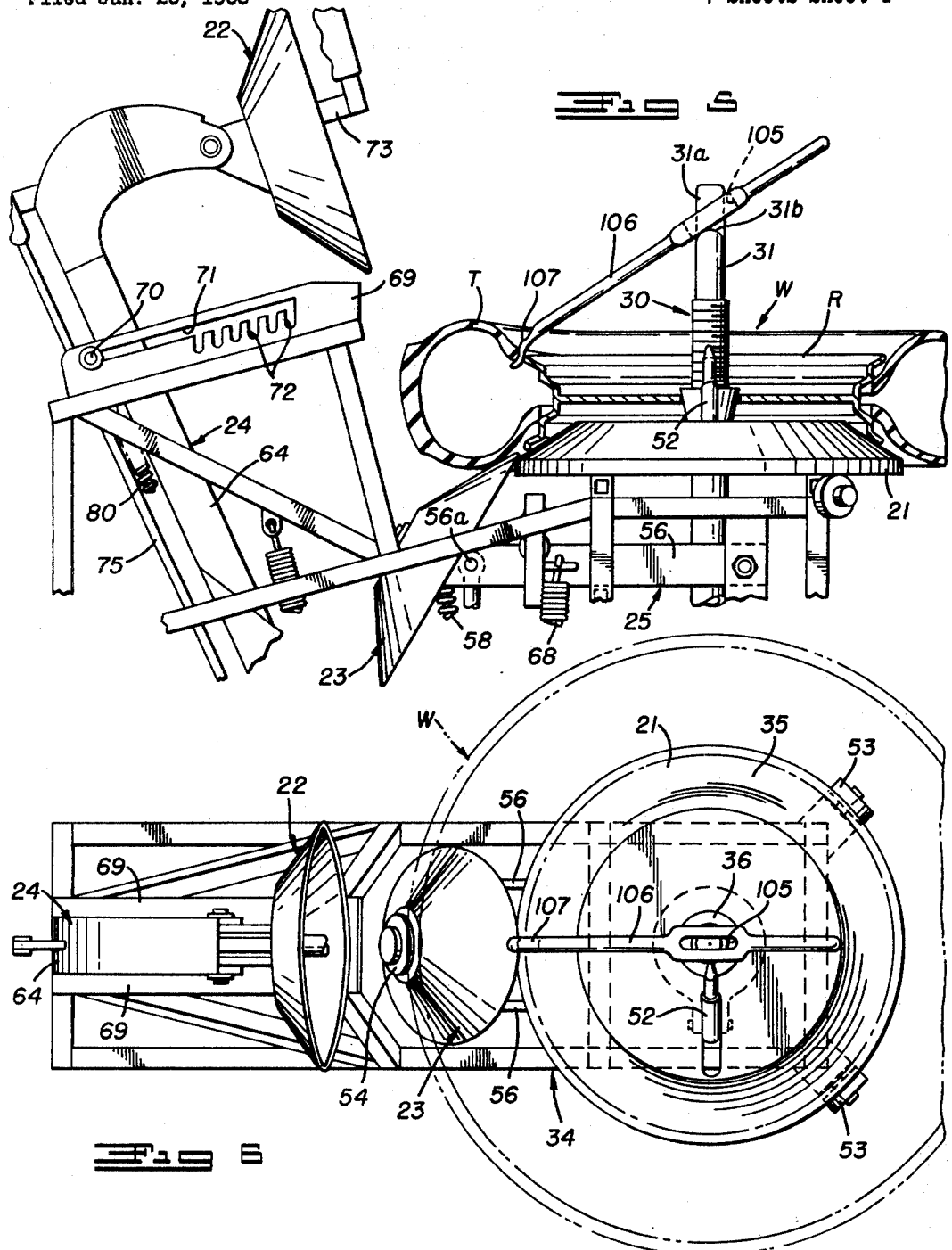

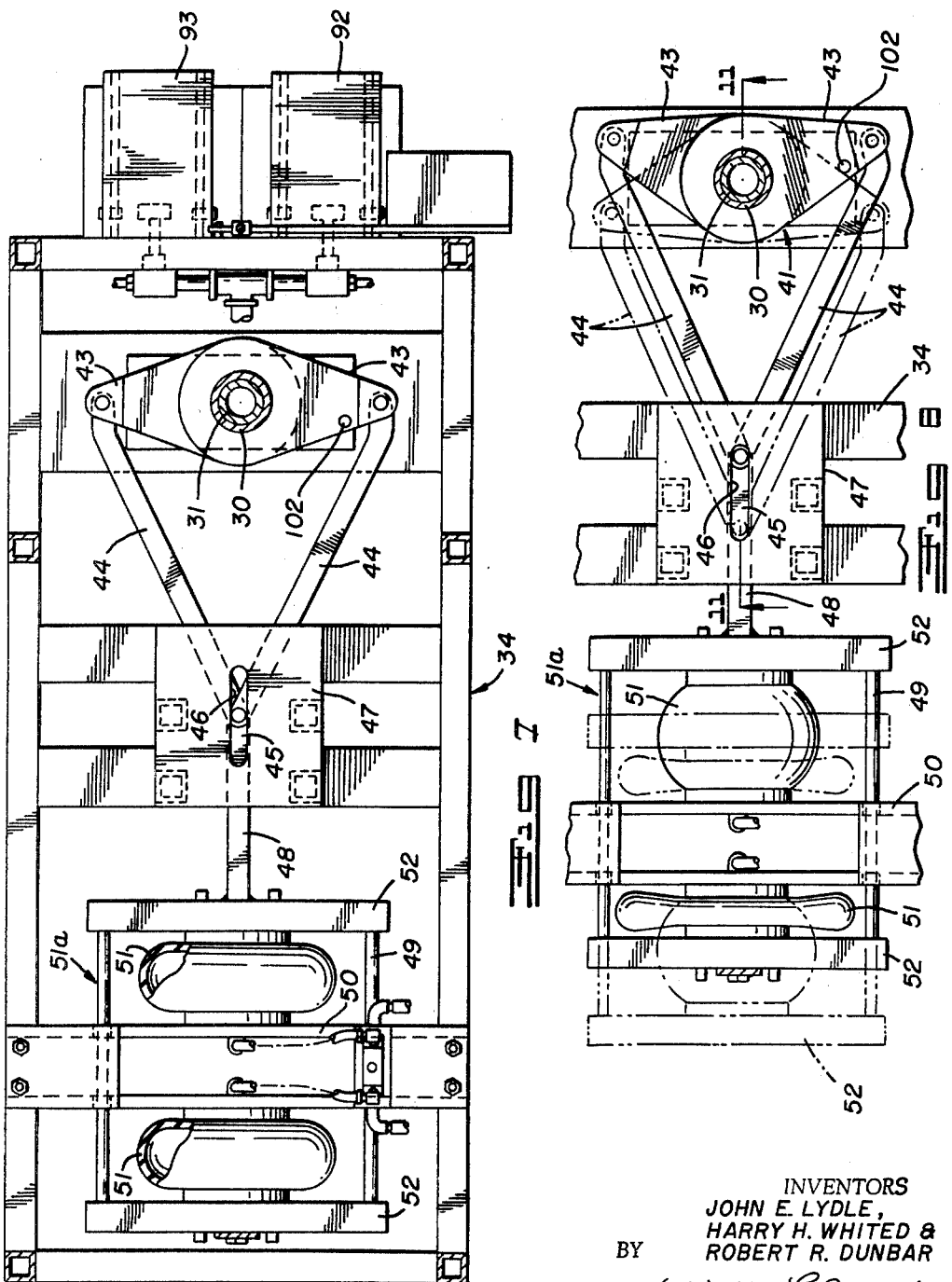

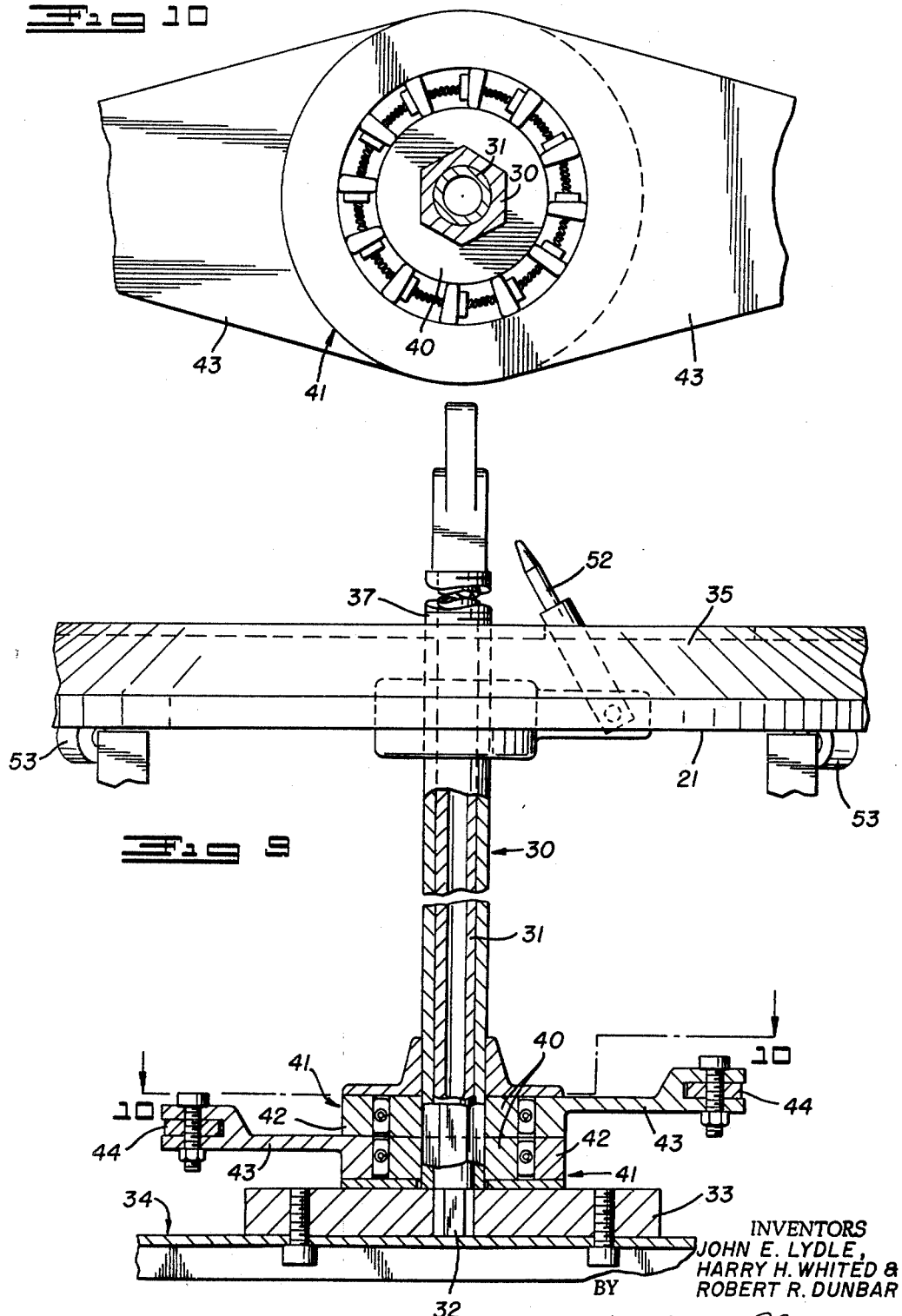

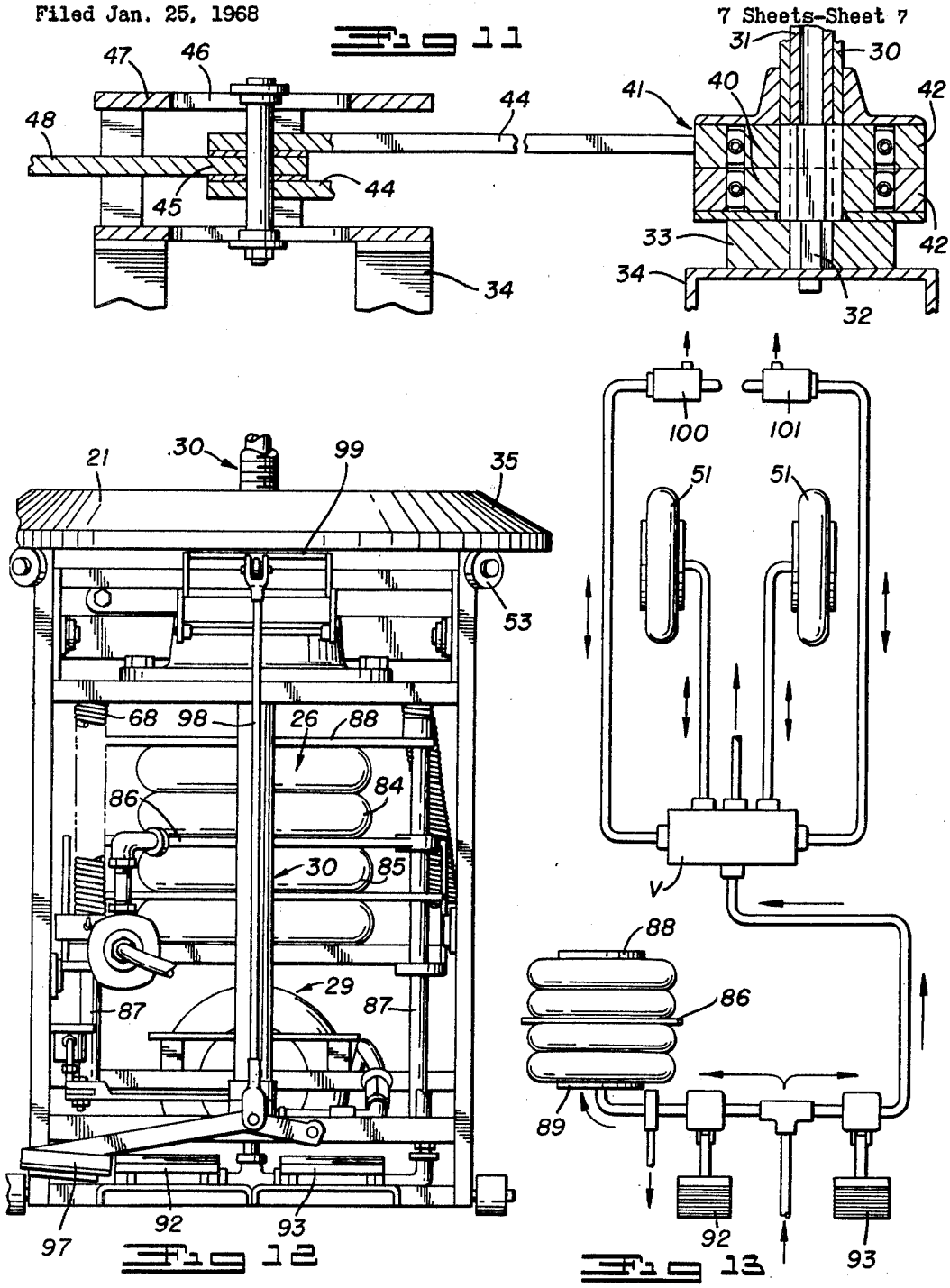
March 17, 1970　　J. E. LYDLE ET AL　　3,500,892
AUTOMATIC TIRE-CHANGING MACHINE
Filed Jan. 25, 1968　　7 Sheets-Sheet 7
INVENTORS
JOHN E. LYDLE,
HARRY H. WHITED &
ROBERT R. DUNBAR
BY
William Cleland
ATTORNEY United States Patent Office 3,500,892
Patented Mar. 17, 1970

ABSTRACT OF THE DISCLOSURE

Tire-changing machine includes rotatable table for supporting wheel-rim and tire assembly, and power means operable to move tools toward and from tire sidewalls and urge tire beads inwardly of respective rim seats, past safety locking ribs. Second power means simultaneously operable unidirectionally to turn table and wheel-rim with rapid succession of partial turns, effective to obviate inherent tendency of released tire beads to return to seated position on seats. Unidirectional rotation of table utilized while engaging other tools between rim flanges and tire beads to release tire beads past rim flanges for tire mounting or demounting purposes.

BACKGROUND OF INVENTION

In the past, numerous tirechanging machines have been provided wherein a table, with a wheel-rim and tire assembly thereon, was relatively rotated while various tire tools were variously applied between rim flanges and tire beads to release or break the beads over safety bead-locking ribs of known types. Manual rotation of the table was generally accomplished as by an operator using one hand to rotate the table while operating a lever-type tool with the other hand, progressively to release a tire bead past the safety rib on the rim seat. Such manual operation was awkward, laborious, and time-consuming, and prior machines of the type referred to were unsatisfactory, if not inoperable, for purposes of changing heavy-duty tires. Where power means was used for relatively rotating the table with respect to the bead-engaging tools for breaking the beads, for example, the work was hampered by the strong inherent tendency for the tire beads to slip back into the bead seats, thereby requiring much repetitious effort.

SUMMARY OF INVENTION

The present invention relates to improved machine for changing a pneumatic tire on a wheel-rim assembly supported on a rotatable table in association with power-operated tire bead-engaging tools. Novel power means, utilizing air-operated bellows, are independently moved by arm means carrying respective tools toward and from pressure engagement with the tire sidewalls to urge tire means over the usual safety ribs on the bead seats. A similar type of power means is utilized in conjunction with a novel one-way clutch mechanism, to rotate the table in one direction with a quick succession of partial turns about the axis of rotation of the table.

One object of the invention is to provide a machine of the character described which is operable to break both beads of a tire over the safety locking ridges on the usual bead seats of the rim, whereby is obviated the normal tendency of the tire beads to creep back onto the rim seats.

Another object of the invention is to provide a machine of the character described which is quickly adjustable for automatic operation to remove both beads of a tire on a wheel-rim within a substantial range of rim sizes.

Other objects of the invention will be manifest from the following brief description and the accompanying drawings.

Of the accompanying drawings:

FIGURE 1 is a side elevation of one embodiment of the improved tire-changing machine of the invention, in non-operative condition, with parts broken away and in section.

FIGURE 2 is a view corresponding to FIGURE 1 but illustrating use of the machine with a tire wheel assembly mounted thereon, and working parts in position for commencement of a bead-breaking cycle of operation of the machine.

FIGURE 3 is a view corresponding to the upper portion of FIGURE 2, illustrating parts of the machine in a further advanced stage of the bead-breaking cycle of operation.

FIGURE 4 is a view corresponding to FIGURE 3, illustrating the condition of the tire bead-engaging parts near the final stage of the bead-breaking cycle of operation by which the tire beads are completely released from both bead seats of the rim.

FIGURE 5 is a view corresponding to FIGURE 1 in which the wheel rim is being progressively rotated with the table, while a lever-type tire tool is used for working the tire bead over the rim flanges for complete removal of the tire.

FIGURE 6 is a top plan view of the machine, partly as shown in FIGURE 5, but with the wheel rim assembly shown in chain-dotted lines.

FIGURE 7 is a horizontal cross-section taken substantially on the line 7—7 of FIGURE 2 and illustrating the power means for unidirectionally turning the rotatable table.

FIGURE 8 is a view corresponding in part to FIGURE 7, but illustrating by use of full and chain-dotted lines, actuation of unidirectional power means, at the end of a full stroke of a reciprocating member thereof, for turning the table through a fraction of a revolution.

FIGURE 9 is a vertical cross-section, on an enlarged scale, taken substantially on the line 9—9 of FIGURE 1, and illustrating the unidirectional operating mechanism for rotating the table.

FIGURE 10 is a further enlarged horizontal cross-section, taken substantially on the line 10—10 of FIGURE 9, to illustrate the one-way clutch device of the table-rotating mechanism.

FIGURE 11 is a vertical cross-section taken substantially on the line 11—11 of FIGURE 8.

FIGURE 12 is an end view, partly broken away, of the machine as viewed substantially on the line 12—12 of FIGURE 1.

FIGURE 13 is a schematic piping diagram of the pneumatic power means for accomplishing selective continuous or automatic operation of the table-turning and bead-breaking means of the machine.

Referring to the drawings generally, and to FIGURES 1, 2, 6, 7, 9, and 12, in particular, there is illustrated one embodiment of the machine as designed to change a tubeless tire in wheel-rim assembly W, fixedly mounted on a table 21 to rotate therewith about a vertical axis in cooperation with a pair of selectively, yieldingly, movable top and bottom tire bead-engaging tools 22 and 23 which are independently mounted on tool-supporting means 24 and 25. Said arm means, carrying said tools, may be selectively operated by a first power means 26 to move the tire tools toward and from the opposite sidewalls of the tire T (see FIGURE 2), and to depress the tire beads from the bead seats 27 and 28 of the rim (see FIGURE 4). A second power means 29 is selectively operable to rotate the table with a substantially rapid succession of unidirectional partial turns of the table, which assures progressive full removal of the tire beads, and inwardly past the safety ribs 27a and 28a on the tire bead seats, in a manner to be described later.

Referring more particularly to FIGURES 1, 7, and 9 to 12, the table 21 may be affixed to the upper end of an elongated sleeve 30 rotatably received over a relatively fixed upright shaft 31, the lower end of which is non-rotatably secured at 32 in a fixed base plate 33 of a suitable housing frame 34. For self-centeringly affixing wheel-rims R of a substantial range of different diameters or sizes thereof on the table 21, the latter may have a conical upper face 35 against which one flange of a said wheel rim R is clamped, as by turning a conical nut 36 of known type on a threaded upper end 37 of rotatable sleeve 30 until the conical portion of the nut 36 tightly engages a peripheral edge 38 defined by a central opening in the wheel.

The table 21 is adapted to be unidirectionally turned, for purposes to be described later, through relatively small substantially equal increments of 360°, by affixing to the lower end of sleeve 30, the inner rings 40, 40 of a pair of superposed one-way clutch members 41. The outer rings 42, 42 of the respective clutch members may have outwardly opposite arm extensions 43, 43 to which separate links 44, 44 are pivoted and extend to common pivotal connection to a slide member 45 slidably retained within an elongated guide slot 46 in a fixed plate 47 of the open work frame means 34. This arrangement is such that with each stroke of slide member 45 in opposite directions, alternately to pull and push the two arms 44 in the same linear direction to effect alternate gripping connections through one or the other of the clutch members 41, and thereby to rotate the sleeve 30 and the table 21 thereon, unidirectionally through a fraction of a revolution about the axis of the fixed shaft 31.

A plate or lug 79, affixed on the lifting rod 75, carries the pin 70 so that tension spring 80 connected to plate 79 will tend to urge the rod 75 and pin 70 downwardly. Accordingly, by means of handle 77 on lever 73, and through the connection of the lever with the pivot 62 of disc 22, the upright 64 may be swung inwardly of table 21, upon its pivotal supporting connection 82 with the arms 56 of arm means 24a, from the general relationship thereof shown in FIGURE 1 to the relative condition shown in FIGURE 3, in which the pin 70 has been yieldingly urged into a selected notch means 72 corresponding to the particular size of the wheel rim assembly W mounted on table 21. At this point, however, the lower arm 56 is yieldingly retained in inoperative position, against stop means 83, by action of strong tension springs 68 and 68a (see FIGURE 1). Likewise, handle 77 is operable yieldingly to lift pin 70 from one notch 72 to another, or for returning the upright to its inoperative condition shown in FIGURE 1.

As best illustrated in FIGURE 1, downward tilting of the bead-breaker disc 22 on pivot 62 is normally limited by engagement of an integral lip 61b, on the bifurcated hub part 61a, with a stop pad 63a affixed within the inturned part 63 of the upright 64.

Referring to FIGURES 1, 2, and 12, the power means 26 is operable for relatively moving the bead-breaker discs 22 and 23, progressively to break the beads of a tubeless tire T on a wheel-rim assembly W. For this purpose, separate top and bottom, multiple convolution, inflatable bellows 84 and 85 may be mounted between a common dividing plate or ring 86 vertically slidable on fixed upright guide rods 87, 87, and top and bottom plates 88 and 89, which are independently slidably mounted on said rods 87. Top plate 88 has affixed thereto a central shaft having the upper end thereof pivotally connected between the arms 56 at 56a for swinging the arm means 25 and disc 23 thereon upwardly. The bottom plate 89 may have spaced upturned flanges 89a, 89a pivotally connected at 82 to the lower arms 56 of arm means 24a for swinging the same downwardly, and thereby to urge the properly adjusted upright 64 downwardly toward bead-breaker engagement of the upper disc 22 with the uppermost bead portion of tire T. Downward movement of the upright 64 may be limited by engagement of a stop member 95 affixed to the face ends of arms 56, with fixed cross-pieces 96 of framework 34 (see chain-dotted lines in FIGURE 1).

For temporarily holding the table 21 affixed against rotation for purposes to be described later, a foot pedal 97 is selectively operable through a rod 98, to apply a brake shoe 99 against the underside of the table (see FIGURES 1 and 12).

That is, with the upright 64 initially manually adjusted in the manner described above to position the upper disc 22 above the wheel-rim assembly W, and in alignment with the bead portions of the upright tire sidewall substantially as shown in full lines in FIGURE 2, compressed air from a suitable source thereof (not shown) is supplied to both the top and the bottom bellows units 84 and 85, through a conduit 91 suitably connected to the interior of the bellows through the slidable plate 86 (see FIGURE 13). With table 21 unidirectionally rotated as previously described, the bellows units 84 and 85 are simultaneously inflated to urge the upper arm means 25 upwardly and the lower arm means 56 downwardly. This operation is effective to engage the top and bottom bead-breaker discs 22 and 23 with the corresponding top and bottom bead portions of the tire, more or less simultaneously according to adjustments which can be made, including adjustments of spring tensions. It may, however, be preferred to make such adjustments in the spring means for the respective arm means, for example, so that the lower bead portions of tire T will be so engaged slightly in advance of similar engagement of the upper bead portion by disc 22 (see FIGURE 2).

As best shown schematically in FIGURE 13, in conjunction with FIGURES 1 and 12, foot pedals 92 and 93, for the disc-operating bellows unit and the table-turning bellows unit, respectively, may be placed relatively close together so that they may be depressed at the same time by pressure of one foot, to operate the two bellows units simultaneously.

Referring to FIGURE 5 of the drawings, there is illustrated a condition of the machine corresponding to that shown in FIGURE 1, but wherein the rotational movement of the table 21 is utilized for completely releasing both beads of the tire over the outermost rim flange without inverting the rim R. For this purpose the fixed upright 31 may have freely extending, straight end portion 31a of generally ovate cross-section and defining shoulder portions 31b for non-rotational reception through substantially complementally shaped aperture in an enlargement 105 of an elongated lever-type tire working tool 106. The tool 106 may have S-curved end 107 adapted to be engaged between the upper rim flange and either one of the tire beads, and held affixed by said non-rotational engagement with the fixed end 31b to lift the respective bead outwardly as the table 21 is progressively rotated in the manner previously described. In other words, the tire T may be completely removed from rim R, substantially without manual effort on the part of the operator.

For reciprocating the slide member 45 in the slot 46, the same may be connected to an extension 48 from a suitable slide frame 49, slidably mounted through a fixed guide member 50 of the framework 34. Power means 51a for reciprocation of the slide frame 49 may comprise a pair of separate, compressed air or other fluid-expansible, reinforced rubber or rubber-like bellows 51, 51, disposed between opposite sides of fixed member 50 and opposite end plates 52, 52 of the frame 49. By alternately supplying compressed air, for example, to the opposite bags 51, 51 the slide member 45 is smoothly and effectively reciprocated, and thereby through the alternately engaged clutch members 41, 41 progressively to rotate the upright sleeve 30 unidirectionally (see full and chain-dotted line positions in FIGURE 8). The table 21 is likewise progressively rotated by the sleeve 30, in given direction, by increments of substantially equal parts of a revolution of the table.

FIGURE 13 schematically illustrates how, by pressing a foot pedal 93, compressed air from a source thereof (not shown) is supplied through a four-way reversing air valve V, and two poppet valves 100 and 101 alternately operated by a finger 102 carrier by one of the arms 43 of the one-way clutch members 41, and thereby alternately to inflate and deflate the two bellows 51, for the purposes described above. The valves referred to are of known type which are connected to the valve V for, alternate quick release of inflation air from the respective bellows.

A locking device 52 is provided on the table 21 for use in known manner to lock the wheel-rim assembly R against rotative movement on the table 21. Suitable rollers 53, 53 support the table 21 at peripherally spaced points to stabilize rotational support of the table against stresses applied during certain tire-changing operations (see FIGURES 1 and 6).

Referring particularly to FIGURES 1 and 6, and to the drawings generally, the lower bead-breaker tool 23 may be dished, frusto-conical type, rotatably mounted on a hub portion 54 which has opposite extensions 55 forming a cross-piece yieldingly pivotally connected, to a limited extent, between free ends of arm means 25, including a pair of parallel arms 56, 56 which, inturn, are pivoted at the other ends thereof to spaced members 57, 57 affixed on the framework 34. Arm means 25 is thereby arranged below the table 21 to be swung yieldingly against the action of tension springs 58, 58, as by power means 26 to be described later, between vertically spaced top and bottom stop members 59 and 60, affixed to the framework 34, thereby to swing disc 23 from the inoperative position thereof, best shown in FIGURE 1, to a bead-breaking position best shown in FIGURE 4.

The upper bead-breaker tool 22, likewise of frustoconical shape, may be rotationally mounted on a hub 61 pivoted at 62 within a bifurcated, inturned upper end 63 of a rigid upright 64, which has a bifurcated lower end portion 65 pivotally connected between the arms 56, 56 of arm means 24a pivoted at 67 to the frame member 57. The arm means 24a is thereby pivoted at 67 to swing downwardly against yielding resistance of tension springs 68 and 68a, generally in the same manner as the upper arm means 56, but more or less independently thereof as will be explained later. By this means the movable upright 64 is normally adjustably supported at an inclination to the vertical, away from the table 21, in order to support the disc 22 and related parts out of the way of positioning or removing the wheel-rim assembly W with respect to the table (see FIGURES 1, 2, and 5). To this end, the movable upright 64 extends slidably between spaced guide plates 69 to rest by the weight thereof outwardly against a pin 70, which is shiftably received through mating inclined slots 71 in the plates 70, said pin normally resting against the lowermost ends of the slots farthest away from the table 21. A series of aligned notches 72, 72 may be provided in the lower edges of guide slots 71, into which pin 70 may be selectively urged to support the movable upright at a selected working angle against pin 70, to have the upper disc 22 in working position above the nearest edge of a wheel-rim flange of given size mounted on table 21, generally as shown in FIGURE 3.

As described, upper tool 22 is spring-urged, as shown in FIGURE 1, to maintain the lower lip thereof in proper relation for yielding engagement with the tire near the rim flange, and allow the tool to move in between the tire bead and the rim flange to position shown in FIGURE 4. The lower tool 23 may be similarly springpressed for the same purposes (see FIGURES 3 and 4).

For manually adjusting the position of upright 64, as described, a lever 73 may be pivoted intermediate its ends to the disc pivot 62 to extend outwardly through the curved part 63, for pivotal connection at 74 to the upper end of a lifting rod 75, the lower end of which is slidably received through a guide member 76 on the upright 64.

In use or operation of the machine, best shown in inoperative condition in FIGURES 1 and 12, as for removing a tubeless pneumatic tire from a wheel-rim assembly W of given size, the assembly W is clamped in centered relation on the table 21 while the latter is held against rotation by temporary application of foot pressure on the pedal 97, to clamp brake shoe 99 against the underside of the table (see FIGURE 12) to permit sliding rotation of rim for alignment valve stem of an inner tube with valve stem hole in wheel, if any. This operation is not required for tubeless tires. Further referring to FIGURE 1, the operator now swings the upright 64 inwardly of the table about the yet relatively fixed pivot 82 on power means 24a, until the pin 70 is spring urged into aligned notches 72 of the fixed guide means 69 corresponding to the size of the wheel-rim R to be operated upon. This is designed to align the lower edge of the upper bead breaker 22 with a point on the uppermost sidewall of tire T radially outwardly of the edge of the uppermost rim flange, substantially as shown in full lines of FIGURE 2.

At this point, the operator applies and mtaintains pressure of one foot upon both of the pedals 92 and 93, simultaneously to operate the table-rotating pneumatic power means 29 and the double bead-breaker operating power means 26. Accordingly, as previously described, the table 21, with the tire and wheel-rim assembly thereon, is continuously rotated with a rapid but smooth, non-jerking succession of partial revolutions, by which a given point on the bead seat 27 may travel on the order of about two inches with each stroke of the slide 45 in either direction (see FIGURE 8). The resultant simultaneous admission of pressurized air yieldingly expands both bellows units 84 and 85 of pneumatic power means 26, and results in more or less simultaneous upward movement of lower breaker disc 23, with pivotal movement of arm means 25, and downward movement of upper breaker disc 22 with downward compound movement of upright 64, through the pivotal connection at 82 with the arm means 24a, all against the yielding resistance of tension springs 68 and 68a.

With progressive yielding downward swinging movement of the two arm means 25 and 24a, the upper and lower bead breakers 22 and 23 move oppositely inwardly of each other, toward yielding pressure engagement with the respective upper and lower tire sidewalls, and into pivotal wedging conformity with the respective tire bead portions under the respective rim flanges, initially as from the general relationship shown in full lines of FIGURE 2 to the partial pressure applying condition illustrated in FIGURE 3. As the yielding pressure applied by the two bead breakers is continued, simultaneously with continued progressive rotation of the wheel assembly W with table 21, as described, the bead breakers 22 and 23 are further yielding urged inwardly toward full pressure movement which releases both tire beads inwardly from the rim seats thereof, including the safety locking ridges 27a, 28a, as illustrated in FIGURE 4. As the rapidly intermittent rotation of the table eliminates the usual tendency for tire beads to revert back into locked position in the rim seats, it is possible to complete the bead-breaking operation, as shown in FIGURE 4, within one full revolution of the table 21. In other words, the machine is substantially automatic to break both tire beads over the usual safety locking ridges on the rim seats, without repetitious effort experienced in use of prior art machines, in a matter of 5 to 8 seconds.

Upon completion of the bead-breaking operation described, the operator may, upon releasing foot pressure on the pedals 92 and 93, return the arm means 25 and 24a to the inoperative positions thereof, and by means of the handle 77 he may return the upright 64 to its inoperative condition, all as shown in FIGURE 1. With the upright in this retracted position, however, the operator, by use of the lever-type tool 106, as shown in FIGURE 5, may operate foot pedal 93, alone, to rotate the table 21 as before, progressively and as necessary to remove both tire beads over the upper flange of the wheel-rim R. A lever-type tool, similar to tool 106, but with a suitable bead positioning head (not shown) may be utilized in the same way progressively to urge tire beads inwardly of the uppermost rim flange.

Modifications of the invention may be resorted to without departing from the spirit thereof or the scope of the appended claims.

What is claimed is:

1. A machine for changing a pneumatic tire of a wheel-rim having bead seats and bead retaining flanges, comprising: a relatively fixed support; a table rotatably mounted on said support; means on said table for affixing a wheel-rim thereof to rotate with the same; a one-way clutch device including oppositely rotatable parts, and unidirectionally rotatable means turned thereby to rotate said table unidirectionally therewith; and power-driven reciprocable means connected to said oppositedly rotatable parts for alternately turning the same unidirectionally and thereby to turn said table with a succession of partial rotations in given direction; a tire-changing tool; and means for supporting said tool progressively to urge the tire bead transversely of a rim flange as the tire is so rotated with the table.

2. A machine as in claim 1, wherein power means for said reciprocable means includes a fixed part; a frame connected to said reciprocable means, said frame being shiftably mounted on said fixed part and having spaced walls at opposite sides of the fixed part; separate inflatable bellows means disposed between each said spaced wall and said fixed part; means for alternately supplying pressurized fluid to said separate bellows to expand and contract the same to reciprocate said frame and thereby to reciprocate said reciprocable means.

3. A machine as in claim 2, said reciprocable means including a guide member; slide means reciprocable in said guide means; and link means between said slide means to provide for said alternate turning thereof.

4. A machine as in claim 1, including separate, inflatable bellows means connected to said reciprocating means, and valving means controlled by reciprocation of said reciprocating means alternately to supply pressurized fluid to said bellows, and thereby alternately to expand and contract the same for driving said reciprocating means.

5. A machine for changing pneumatic tires of a wheel-rim, comprising a table; means for supporting said table to be relatively rotatable about an axis; mounting means for affixing a wheel-rim on said table to rotate therewith about said axis; a pair of tire bead engaging tools; independent arm means for each said bead engaging tool; power means for independently moving said arm means to urge said tools toward and from pressure engagement with opposite sidewalls of the tire on the affixed wheel rim to depress the tire beads oppositely inwardly of the bead seats thereof on the wheel-rim; power-operated driving means for progressively rotating said table in given direction while said tire beads are oppositely inwardly depressed, progressively to release the tire beads oppositely inwardly from the rim seats thereof.

6. A machine as in claim 5, said driving means including a clutch mechanism operatively connected to said table to rotate the same in given direction, and a continuously reciprocable element connected to said clutch mechanism to operate the same.

7. A machine as in Claim 6, said clutch mechanism including separate rotatable clutch parts, connected to said reciprocable element for alternate operation of said rotatable clutch parts thereby with each stroke of the reciprocable element, whereby said table is progressively rotatable by a succession of unidirectional partial turns about said axis.

8. A machine as in claim 5, said driving means including a one-way clutch device having oppositely rotatable parts and unidirectionally rotatable means turned thereby to rotate said table unidirectionally therewith, and reciprocable means for rotating said oppositely rotatable parts in reverse directions with each reciprocating stroke; and power means including a fixed part, a frame connected to said reciprocable means, said frame being shiftably mounted on said fixed part and having spaced walls at opposite sides of the fixed part, searate inflatable bellows means disposed between each said spaced wall and said fixed part, and means for alternately supplying pressurized fluid to said separate bellows to expand and contract the same to reciprocate said frame and thereby to reciprocate said reciprocable means.

9. A machine as in claim 5, said driving means including a one-way clutch device having oppositely rotatable parts and unidirectionally rotatable means turned thereby to rotate said table unidirectionally therewith, and reciprocable means for rotating said oppositely rotatable parts in reverse directions with each reciprocating stroke; and power means including a fixed part, a frame connected to said reciprocable means, said frame being shiftably mounted on said fixed part and having spaced walls at opposite sides of the fixed part, separate inflatable bellows means disposed between each said spaced wall and said fixed part, and means for alternately supplying pressurized fluid to said separate bellows to expand and contract the same to reciprocate said frame and thereby to reciprocate said reciprocable means; said reciprocable means including a guide member, slide means reciprocable in said guide means, and link means between said slide means and said rotatable parts to provide for said alternate turning thereof.

10. A machine as in claim 5, said driving means including a one-way clutch device having oppositely rotatable parts and unidirectionally rotatable means turned thereby to rotate said table unidirectionally therewith, and reciprocable means for rotating said oppositely rotatable parts in reverse directions with each reciprocating stroke; and power means including a fixed part, a frame connected to said reciprocable means, said frame being shiftably mounted on said fixed part and having spaced walls at opposite sides of the fixed part, separate inflatable bellows means disposed between each said spaced wall and said fixed part, and means for alternately supplying pressurized fluid to said separate bellows to expand and contract the same to reciprocate said frame and thereby to reciprocate said reciprocable means, said reciprocable means including separate, inflatable bellows means connected to said reciprocating means, and valving means controlled by reciprocation of said reciprocating means alternately to supply pressurized fluid to said bellows, and thereby alternately to expand and contract the same for driving said reciprocable means.

11. A machine for changing a pneumatic tire of a wheel rim having bead seats and bead retaining flanges, comprising: a relatively fixed support; a table rotatably mounted on said support means on said table for affixing a wheel rim thereto to rotate with the same; a one-way clutch device including oppositely rotatable parts, and unidirectionally rotatable means turned thereby to rotate said table unidirectionally therewith, and power-driven reciprocable means connected to said oppositely rotatable parts for alternately turning the same unidirectionally and thereby to turn said table with a succession of partial rotations in given direction; a pair of tire bead engaging tools; independent arm means for each said bead engaging tool; power means for independently moving said arm means to urge said tools toward and from pressure engagement with opposite sidewalls of the tire on the affixed wheel rim to depress the tire beads oppositely inwardly of the bead seats thereof on the wheel rim; power-operated driving means for progressively rotating said table in given direction while said tire beads are oppositely inwardly depressed, progressively to release the tire beads oppositely inwardly from the rim seats thereof.

12. A machine as in claim 11, wherein power means for said reciprocable means includes a fixed part, a frame connected to said reciprocable means, said frame being shiftably mounted on said fixed part and having spaced walls at opposite sides of the fixed part, separate inflatable bellows means disposed between each said spaced wall and said fixed part, and means for alternately supplying pressurized fluid to said separate bellows to expand and contracts the same to reciprocate said frame and thereby to reciprocate said reciprocable means.

13. A machine as in claim 12, said reciprocable means including a guide member, slide means reciprocable in said guide means, and link means between said slide means and said rotatable parts to provide for said alternate turning thereof.

14. A machine as in claim 11, including separate, inflatable bellows means connected to said reciprocating means, and valving means controlled by reciprocation of said reciprocating means alternately to supply pressurized fluid to said bellows, and thereby alternately to expand and contract the same for driving said reciprocating means.

15. A machine as in claim 11, said driving means including a clutch mechanism operatively connected to said table to rotate the same in given direction, and a continuously reciprocable element connected to said clutch mechanism to operate the same.

16. A machine as in claim 11, said clutch mechanism including separate rotatable clutch parts, connected to said reciprocable element for alternate operation of said rotatable clutch parts thereby with each stroke of the reciprocable element, whereby said table is progressively rotatable by a succession of unidirectional partial turns about said axis.

17. A machine as in claim 11, said reciprocable means including a guide member; slide means reciprocable in said guide means; and link means between said slide means and said rotatable parts to provide for alternate turning thereof.

18. A machine as in claim 11, said power means including separate inflatable arm-operating bellows means connected to the respective said arm means, and valving means connected to said arm-operating bellows means to operate the same for movement of the respective said arm means; said reciprocating means having connected thereto separate table-operating bellows means, valving means being connected to said table-operatinng bellows means and controlled by operation of said reciprocating means, alternately to supply pressurized fluid thereto, and thereby alternately to expand and contract table-operating bellows means to drive said reciprocable means.

19. A machine as in claim 11, said power means including separate inflatable arm-operating bellows means connected to the respective said arm means, and valving means connected to said arm-operating bellows means to operate the same for movement of the respective said arm means; said reciprocating means having connected thereto separate table-operating bellows means, valving means being connected to said table-operating bellows means, and controlled by operation of said reciprocating means, alternately to supply pressurized fluid thereto, and thereby alternately to expand and contract table-operating bellows means to drive said reciprocable means, said valving means for said arm-operating bellows means and for said table-operating bellows means including separate foot-actuated pedal means simultaneously operable by pressure of one foot to actuate both said bellows means at the same time.

20. A machine as in claim 11, one said arm means carrying the tool for a side of the tire outwardly of said table including a first arm part movable by said power means therefor, and a second arm part adjustably carried thereby and selectively adjustable thereon for movement of the respective tool on the adjusted second part, toward and from the outwardly presented side of the tire, according to the size of the wheel rim.

References Cited

UNITED STATES PATENTS

| | | | |
|---|---|---|---|
| 1,498,299 | 6/1924 | Rollins | 157—1.24 |
| 1,538,875 | 5/1925 | Stevens | 157—1.24 |
| 2,912,047 | 11/1959 | Douglas et al. | 157—1.24 |

GRANVILLE Y. CUSTER, JR., Primary Examiner